United States Patent
Puthuff (10) Patent No.: US 8,776,029 B2
(45) Date of Patent: Jul. 8, 2014

(54) SYSTEM AND METHOD OF SOFTWARE EXECUTION PATH IDENTIFICATION

(75) Inventor: Neil Puthuff, Ladera Ranch, CA (US)

(73) Assignee: Zerodee, Inc., Wilmington, DE (US)

( * ) Notice: Subject to any disclaimer, the term of this patent is extended or adjusted under 35 U.S.C. 154(b) by 131 days.

(21) Appl. No.: 13/428,572

(22) Filed: Mar. 23, 2012

(65) Prior Publication Data

US 2012/0246625 A1 Sep. 27, 2012

Related U.S. Application Data

(60) Provisional application No. 61/466,818, filed on Mar. 23, 2011.

(51) Int. Cl.
*G06F 9/44* (2006.01)

(52) U.S. Cl.
USPC .......................................................... 717/131

(58) Field of Classification Search
USPC .......................................................... 717/130
See application file for complete search history.

(56) References Cited

U.S. PATENT DOCUMENTS

| | | | |
|---|---|---|---|
| 7,454,665 B2 | 11/2008 | Menadue | |
| 7,987,390 B2 * | 7/2011 | Chandrasekaran | 714/38.1 |
| 7,992,133 B1 | 8/2011 | Theroux et al. | |
| 8,069,374 B2 * | 11/2011 | Panigrahy et al. | 714/38.1 |
| 8,185,879 B2 * | 5/2012 | Thekkath et al. | 717/128 |
| 2002/0124208 A1 | 9/2002 | Beer et al. | |
| 2003/0061542 A1 | 3/2003 | Bates et al. | |
| 2005/0114743 A1 | 5/2005 | Moorhouse | |
| 2005/0223361 A1 | 10/2005 | Belbute | |
| 2006/0179357 A1 | 8/2006 | Bergstrom | |
| 2008/0276081 A1 * | 11/2008 | Nair | 712/240 |
| 2008/0288826 A1 | 11/2008 | Nemoto | |
| 2009/0271663 A1 | 10/2009 | Vining | |
| 2009/0282294 A1 | 11/2009 | Edwards | |
| 2010/0100774 A1 | 4/2010 | Ding et al. | |
| 2010/0251031 A1 | 9/2010 | Nieh et al. | |
| 2010/0281303 A1 | 11/2010 | Cates | |
| 2010/0281310 A1 | 11/2010 | Hou et al. | |
| 2010/0299559 A1 | 11/2010 | Randimbivololona | |

FOREIGN PATENT DOCUMENTS

WO WO 2008/050094 5/2008

* cited by examiner

*Primary Examiner* — Li B Zhen
*Assistant Examiner* — Hui-Wen Lin
(74) *Attorney, Agent, or Firm* — Michael Best & Friedrich LLP (57) ABSTRACT

A method and system for creating uniquely representative execution path identifiers of software program. The method comprises the steps of running the software program, continuously accessing execution information of the software program, identifying execution sequences of the execution information, and creating a unique execution path identifier of each of the execution sequences by summing the execution information when the execution information is within a functional boundary thereof so as to create an execution path identifier representing a unique execution sequence of the execution information. The system comprises an execution path identification creator continuously receiving and accessing execution information of the software program, identifying execution sequences of the execution information and creating the unique execution path identifier of each of the execution sequences.

12 Claims, 10 Drawing Sheets

```
int example(int a) {
    int b=0;
    if(a<=0)
        b=20;
    else
        b=25;
    return b;
}
```

```
    0x92705073
  + 0x4246465a
  ─────────────
    0xd4b696cd    = Path Id without interrupt
```

Figure 10

| CALL GRAPH ||
|---|---|
| FUNC NAME | PATH ID, COUNT, ADDR |
| `func1()`<br>`├─func1a()`<br>`│  └─funcX()`<br>`├─func1b()`<br>`└─func1c()`<br>`   └─funcX()`<br>`      └─funcY()` | `val1, count1, addr1`<br>`val2, count2, addr2`<br>`val3, count3, addr3`<br>`val4, count4, addr4`<br>`val5, count5, addr5`<br>`val6, count6, addr3`<br>`val7, count7, addr7` |
| PATH ID SUM CANDIDATES ||
| `funcXYs = val6 + val7`<br>`func1cs = val5 + funcXYs`<br>`func1as = val2 + val3`<br>`func1s  = val1+func1as+val4+func1cs` ||

Figure 11

SYSTEM AND METHOD OF SOFTWARE EXECUTION PATH IDENTIFICATION

CROSS-REFERENCE TO RELATED APPLICATION

This Application claims the benefit under 35 U.S.C. 119(e) of U.S. Provisional Application Ser. No. 61/466,818 filed Mar. 23, 2011 by Puthuff, N., which is hereby incorporated herein by reference in its entirety.

BACKGROUND OF THE INVENTION

1. Field of the Invention

The present invention relates to development and analysis of software programs, and, more particularly, to a method and system for creating uniquely representative execution path identifiers of software program.

2. Description of the Related Art

Developers of computer software have for over 50 years suffered a mismatch of information density to their needs. Within a computer system exists a superabundance of information about the executing software: every executed instruction, every data. value, and every iteration of every function. Within this vast information resides evidence of all software defects (bugs) and intimate details about how all of the code actually behaves. Unfortunately, no prior art has devised a method of both efficiently exporting that information for developer use, and organizing it to make it easier to find defects and to gain understanding of how software actually works. All prior art methods have sought to either severely limit the amount of exported information to a small, predefined subset (such as with breakpoint debuggers), or have enabled mass export of this data in its raw form (such as with trace debuggers), without assisting the software developer in organizing this mass of data.

The inherent problem with analyzing and debugging computer software has been in effectively managing complexity and information on a very large scale. From the earliest days of computer software, a subtle defect in a 20-line application running at 1000 instructions per second could confound even the best engineers, who could struggle for many hours to capture an infrequent anomaly that happens unpredictably in the midst of correct operation Software applications have since grown to millions of lines of code running at billions of instructions per second, yet these same troubles remain, Furthermore, the defect rates of software have remained nearly constant for decades, often exceeding 50 defects per 1000 lines of code for newly-written software, to less than 1 defect per 1000 lines of code for software developed in a rigorous development model. Even with 80% of the cost of developing software being consumed by finding and fixing software defects, this is usually a process of achieving 'good enough' software that contains fewer than 10 defects per 1000 lines of code, so software is regularly and knowingly released with hundreds of defects, and the cost of these defects are measured in the tens of billions of US dollars annually.

Prior-art techniques for debugging and analyzing software execution can be classified. into two categories, depending on their intrusiveness, Highly intrusive techniques include breakpoint debuggers, single-stepping through program code, and print debugging. These approaches can alter the flow of program execution enough to make the original problems non-reproducible during debugging. Low-intrusive techniques include real-time trace ports such as ARM ETM, MIPS PDTrace and IEEE/ISTO Nexus-5001, which do not intrude on program execution, but often require substantial resources (package pins for trace export or substantial on-chip buffers). All of these techniques suffer from serious drawbacks.

First, all of these methods are created on the premise that a software developer will search for the cause of one known, reproducible bug at a time. This requires the developer to first make an educated guess about where a particular defect originates, so a breakpoint, trigger or other mechanism can be set to enable capture of the exact portion of execution data that contains evidence of the cause of the present problem. This is usually an iterative process, since the cause of software errors are often not easy to determine, and a series of iterations can add up to span a long time duration to find and correct just one error, particularly if the error has a tow recurrence rate or is otherwise difficult to reproduce, Second, these techniques will only help a developer to isolate software defects that they become aware of through external symptoms. Defects with subtle symptoms or very low recurrence rates can often elude detection through the entire development process, and end up shipping with the final product.

Third, these techniques only produce raw information about a particular moment of execution, but they do not provide context information as to whether this portion of execution is unusual, or if it is merely another instance of a common execution sequence.

Advancements have been made to try to solve some of these shortcomings. To provide more information to the software developer, real-time trace collection capacity has been steadily expanding, with premium trace collection probes (from Lauterbach GmbH, Green Hills Software Inc., etc.) offering capacities of up to 4GB, However, this capacity increase is somewhat misleading, as it only offers bulk collection capacity, but does not perform real-time characterization of the data to determine if it is actually useful and contains valuable information about a transient defect or other low-recurrence event. Trace data collection is still mainly centered on a pre-defined trigger event that is the suspected cause of a single defect of interest. Regardless of the capacity, a real-time trace collection system that cannot continuously collect and categorize the execution information will impose limits on the developers visibility into the executing software, and the process of debugging will likely remain a one-known-bug-at-a-time endeavor.

Several approaches to reducing the bandwidth requirements tor instruction trace export have been devised. Current industry-standard trace ports can reach an average as low as 1.2 to 0.4 bits per instruction for instruction-only trace export.

On-the-fly examination of execution sequences has been studied by Hou et al. (US 2010/0281310 A1), but this method is focused on identifying whether a single pre-determined execution sequence has occurred, as a means of creating a trigger for capturing the associated data. This is unlike the present invention, which is a compression and identification system for the entirety of software running on a target computer system. The system devised by Panigrahy et al. (U.S. Pat. No. 8,069,374 B2) creates 'fingerprints' from the text of system event log files for the purpose of automating the correction of system configuration errors, so unlike the present invention it cannot identify software bugs or behavioral anomalies at the function level, and it cannot be practically implemented in computer logic.

For software running on computer systems that lack any form of execution trace, the available options for debugging and understanding the behavior of target software are generally very intrusive and are required to place severe limitations on the total amount of information that can be obtained from the computer system. Breakpoint debuggers, and instrumented or sampled execution profiling arc the primary options for software developers on these platforms, but both are highly intrusive, and neither performs compression/decompression to reduce bandwidth and storage requirements.

The net result of these issues is that software development remains an expensive process. Software has become the single most expensive component in modern automobiles, aircraft, and scores of other devices, and is often the key determining factor in a products success or failure. Current trends point toward faster processors, more processing cores, and larger applications, which indicates that these problems likely get worse.

While known techniques for analyzing software execution have proven to be acceptable for some applications, such techniques are nevertheless susceptible to improvements advance the art.

SUMMARY OF THE INVENTION

The present invention is directed a method and system for creating uniquely representative execution path identifiers of software program.

A first aspect of the invention provides a method for creating software execution path identification, comprising the steps of running a software program, continuously accessing execution information of the software program, identifying execution sequences of the software execution information, and creating a unique execution path identifier of each of the execution sequences by summing the execution information when the execution information is within a functional boundary thereof so as to create an execution path identifier representing a unique execution sequence of the execution information.

A second aspect the invention provides a system for creating software execution path identification. The system comprises an execution path identification creator continuously receiving and accessing execution information of a software program, identifying execution sequences of the software execution information and creating a unique execution path identifier of each of the execution sequences by summing the execution information when the execution information is within a functional boundary thereof so as to create an execution path identifier representing a unique execution sequence of the execution information.

BRIEF DESCRIPTION OF THE DRAWINGS

The accompanying drawings are incorporated in and constitute a part of the specification. The drawings, together with the general description given above and the detailed description of the exemplary embodiments and methods given below, serve to explain the principles of the invention. The objects and advantages of the invention will become apparent from a study of the following specification when viewed in light of the accompanying drawings, wherein.

Table 1 depicts the resulting native computer instructions, for the example in FIG. 7, as built for ARM architecture processors.

Table 2a depicts the execution of the instructions in Table 1 if passed an argument. value of 0, and construction of a unique path identifier for that execution.

Table 2b depicts the execution of the instructions in Table 1 if passed an argument value of 1, and construction of the unique path identifier for that execution.

TABLE 2c illustrates how even small changes in the executing software will result in large changes to the resulting execution path identification value.

Table 3 depicts the implementation of the present invention as a software-only solution using the example source code from FIG. 7; and Table 4 depicts the effect of interrupts or exceptions on the processing of instruction trace compression.

DESCRIPTION OF EXEMPLARY EMBODIMENTS

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

This description of exemplary embodiments is intended to be read in connection with the accompanying drawings, which are to be considered part of the entire written description. The word "a" as used in the claims means "at least one" and the word "two" as used in the claims means "at least two".

A method and system for creating uniquely representative execution path identifiers of computer software according to the present invention wilt be described in detail with reference to the accompanying drawings.

Figure 1:
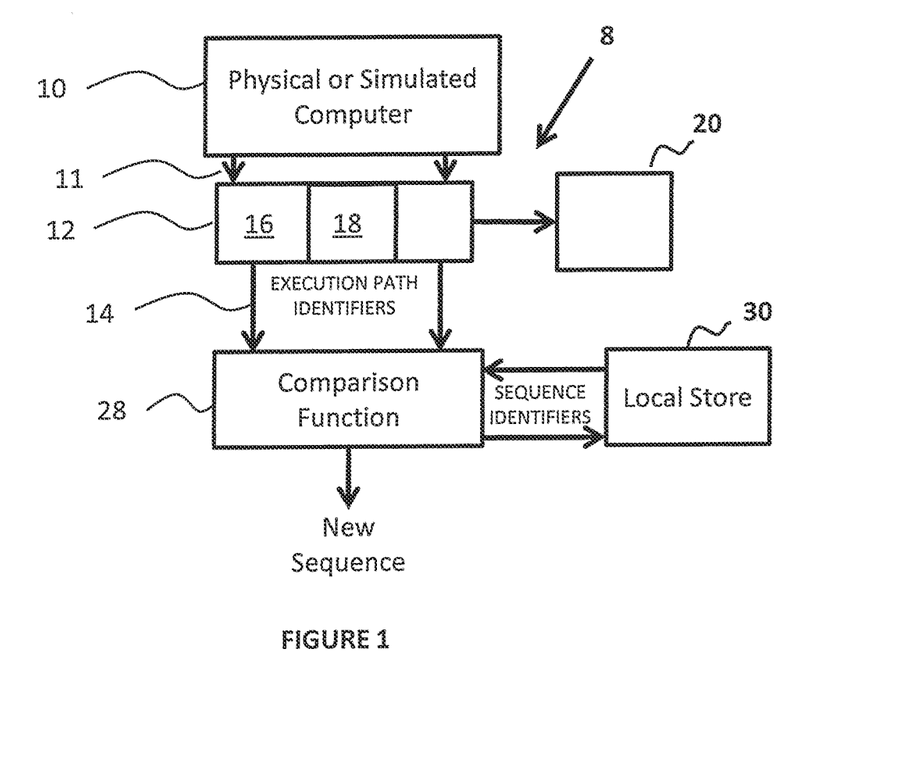
FIG. 1 shows a block diagram depicting a system accepting software execution instructions and outputting a unique execution path identifier combined with a local store and a comparison logic to implement a detector of execution sequences that had not been previously observed, according to the present invention.
Figure 2:
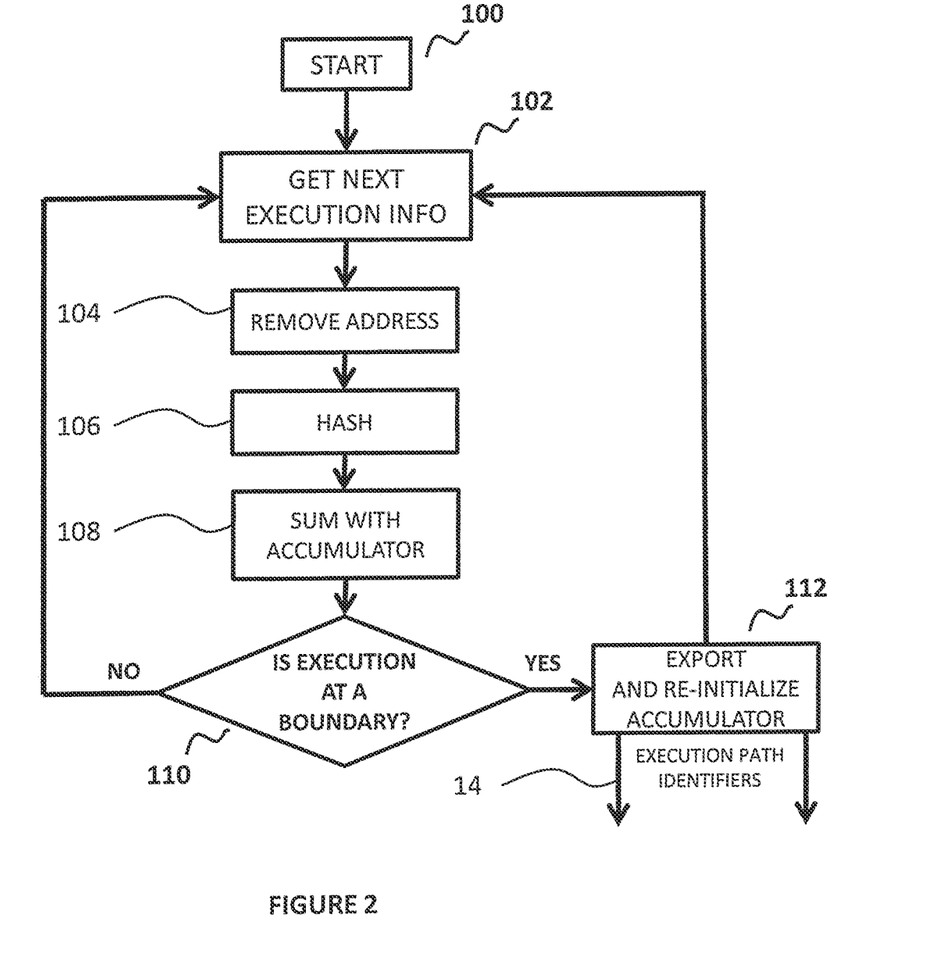
FIG. 2 shows a flow chart depicting a compression operation performed by an execution path identification creator, shown in FIG. 1, for creating the unique execution path identifier of each of execution sequences of computer software according to the present invention.

FIGS. 1 and 2 schematically illustrate a system and method for accepting software execution instructions and outputting compressed behavioral data according to the present invention. Specifically, the compressed behavioral data is in the form of execution path identifiers representing unique execution sequences of said execution instructions.

Referring to FIG. 1, the system of the present invention, generally depicted by the reference numeral 8, comprises a computer system 10 (physical or simulated) running a software program by continuously executing software information (such as software instructions or software execution data). According to the exemplary embodiment of the present invention, the execution information is in the form of conditional execution instructions. Moreover, the conditional execution instructions are in the form of operation codes (or opcodes) and condition flags. In computer science, an opcode (operation code) is the portion)f a machine language instruction that specifies the operation to be performed. Their specification and format are laid out in the instruction set architecture of the processor in question (which may be a general CPU or a more specialized processing unit).

An input stream or trace of the software execution information, generally depicted with the reference numeral 11, (i.e., the software instructions, the execution status, the address, etc.) s continuously supplied to an execution path identification creator 12 while executing (running) a software program, An execution path is the path through which input data (i.e., the software execution instructions) passes during the period of being processed in operation modules of the computer system 10. In each operation module of the computer system 10, there are typically various branch points so that different input data may pass through different branches at these branch points. The branches through which the input data passes form an execution path of the input data.

The execution path identification creator 12 converts the input stream or trace of the software execution information 11 from the computer system 10 into a stream of encoded data values representing a specific path taken by the software execution information executed within each path. The data values are uniquely created for every specific execution path, and directly serve as behavior identifiers for the executing software program. The stream of encoded data values represents at least one unique execution sequence of the software execution instructions. Specifically, the execution path identification creator 12 continuously accesses the execution instructions of the computer software, identifies execution sequences of the software execution instructions, and creates a unique execution path identifier 14 of each of the execution sequences by summing the conditional execution instructions when the conditional execution instructions are within a functional boundary thereof so as to create the unique execution path identifier 14 representing a compressed unique execution sequence of the execution instructions. The resulting execution path identifier 14 is then available for writing to a storage device 20.

As further illustrated in FIG, 1, the system 8 according to the present invention further comprises a comparison logic 28 and a local storage medium 30 collecting the stream of the execution path identifiers for later retrieval and decompression. The execution path identifier 14 is supplied to the comparison logic 28 as a means of detecting when a previously-unseen (i.e., not previously observed execution sequence has happened. In other words, the system and method according to the presentation determine whether each of the execution sequences of the software execution information is a new execution sequence or a repeat execution sequence by comparing the execution path identifier 14 of the software execution information determined by the execution path identification creator 12 with the execution path identifiers previously stored in the local storage medium 30.

As illustrated in FIG. 2, a compression operation performed by the execution path execution path identification creator 12 (shown in FIG. 1) for encoding an input data stream, starts at step 100. At step 102, the execution path identification creator 12 receives the next software execution information 11. After that, in the execution path identification creator 12, the software execution information 11 are decoded and address-dependent portions are removed by a decode logic device 16 of the execution path identification creator 12 (shown in FIG. 1) at step 104, then converted to a hash vat e at step 106 before being summed within an accumulator 18 (shown in FIG. 1) at step 108, should be understood that an accumulator is a register in a central processing unit (CPU), in which intermediate results are stored.

The above-described process continues until the functional boundary is reached in the program image as determined at step 110, at which point a resulting sum 16 in the accumulator 18 generated at the step 108 is exported as a unique, repeatable representation of the behavior of that segment of the software program at step 112, and the accumulator 18 is reset to a base value to begin accumulation of the path identification of the software execution information of the next segment of software program. The resulting sum represents an execution path identifier 14.

The next drawings illustrate the present invention with application-specific requirements.

Figure 3:
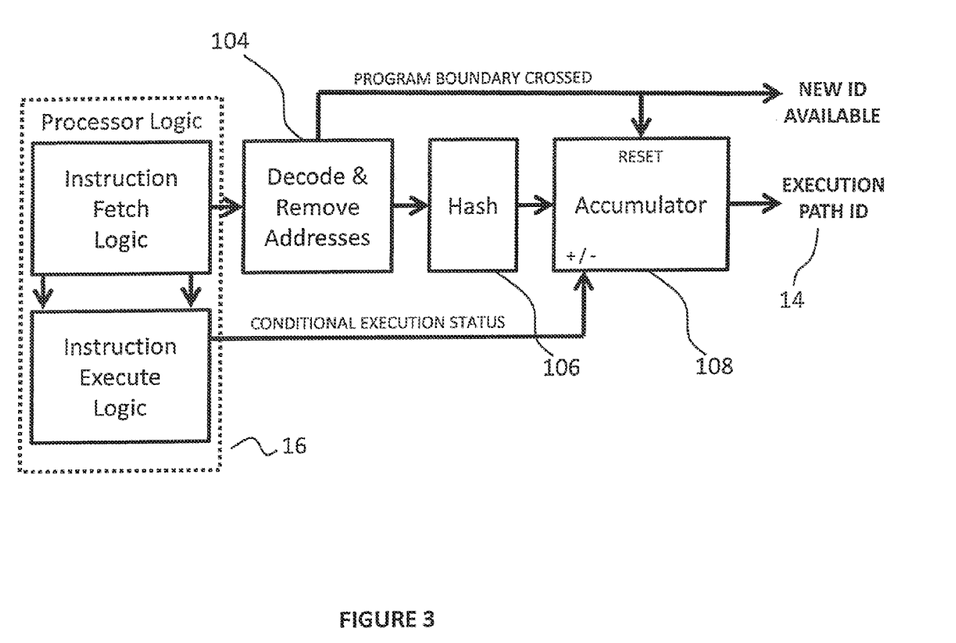
FIG. 3 is a block diagram depicting the compression unit implemented in computer logic.

FIG. 3 shows a block diagram of the method according to the present invention implemented in a computer logic.

Figure 4:
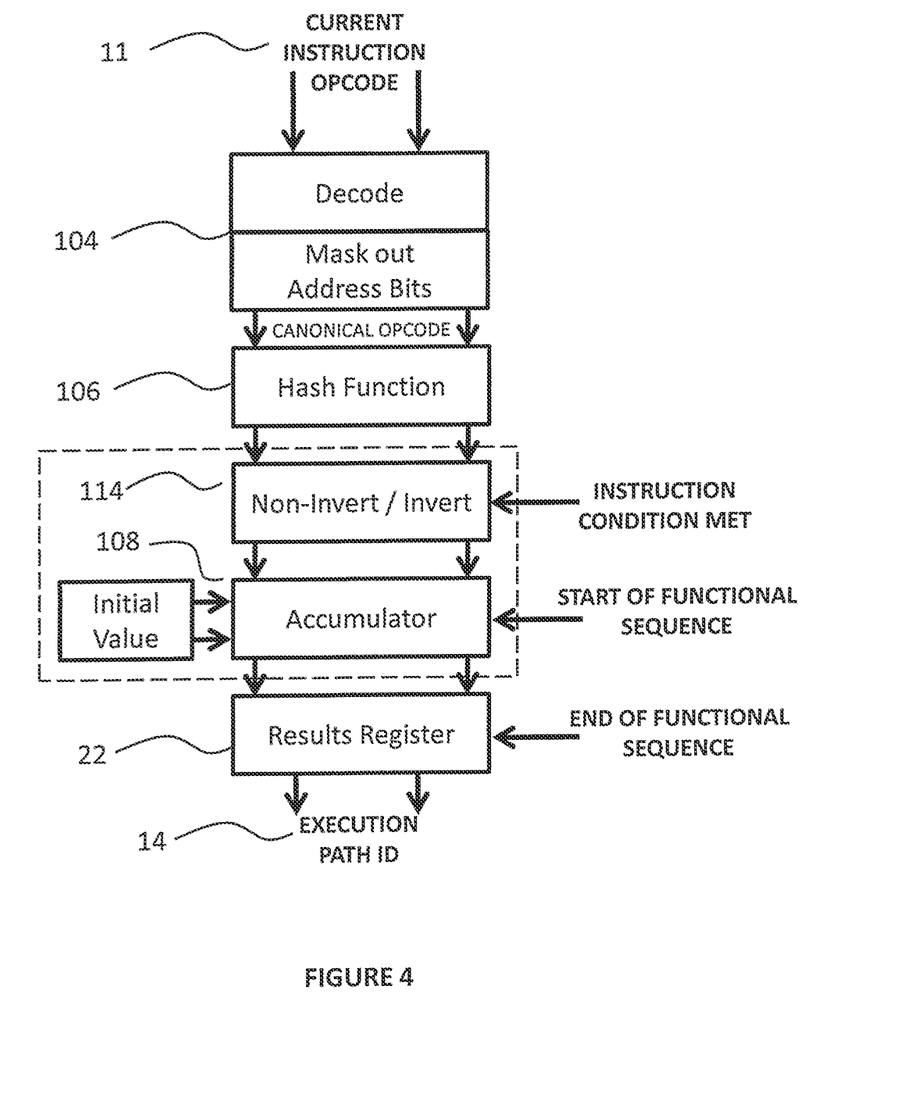
FIG. 4 is a block diagram depicting the compression unit implemented as a processor of existing execution trace information.

FIG. 4 shows a detailed block diagram of the internal operations of the present invention. The next-in-stream instruction opcode 11 is received by the decode logic device 16, which detects functional boundaries and removes the address portions of the opcode 11, leaving an address-independent canonical form of the instruction at step 104. This address-independent form ensures that an execution type will produce the same results, even if that software program is executed from different address locations in a computer memory. The canonical opcode is then presented to hash function 106 where a standard hash function, such as MD5 or murmurhash3, will convert the sometimes subtle differences in software execution information encodings into vastly different resulting values, helping to ensure uniqueness in the resulting execution path identification value. The hashed canonical opcode is then combined with any preceding values in the accumulator 18 (shown in FIG. 1) at step 108, either as a non-inverted value if the associated instruction was conditionally executed, or as an inverted value if the associated instruction was conditionally not executed (at step 114). This conditional inversion (step 114) helps to distinguish the execution paths that include conditional non-branch instructions, which may or may not execute depending on conditions. When the functional boundary is detected by decode logic 16 (shown in FIG. 1), the resulting execution path identifier 14 in the accumulator 18 is exported to a results register 22, where it is available to additional logic, storage, or export.

Figure 5:
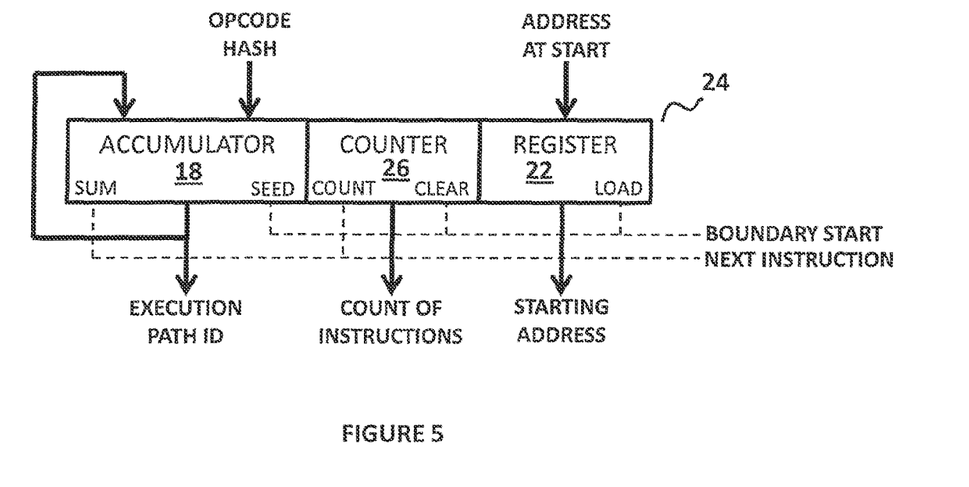
FIG. 5 shows an accumulator logic including additional resources to collect and export an associated address in memory of an execution path sequence and a number of the software execution instructions contained within the sequence of execution.

FIG. 5 depicts the structure of accumulator logic 24, optionally including additional resources to collect and export the associated address in memory of an execution path sequence, and the number of instructions contained within that sequence of execution. While not strictly required, including these values can assist during decompression to quickly determine an exact match for the path of execution, and can reduce the possibility of unresolvable collisions in execution path identification values. As illustrated in FIG. 5, the accumulator logic 24 may include the accumulator 18, a counter 26, and the register 22.

Figure 6:
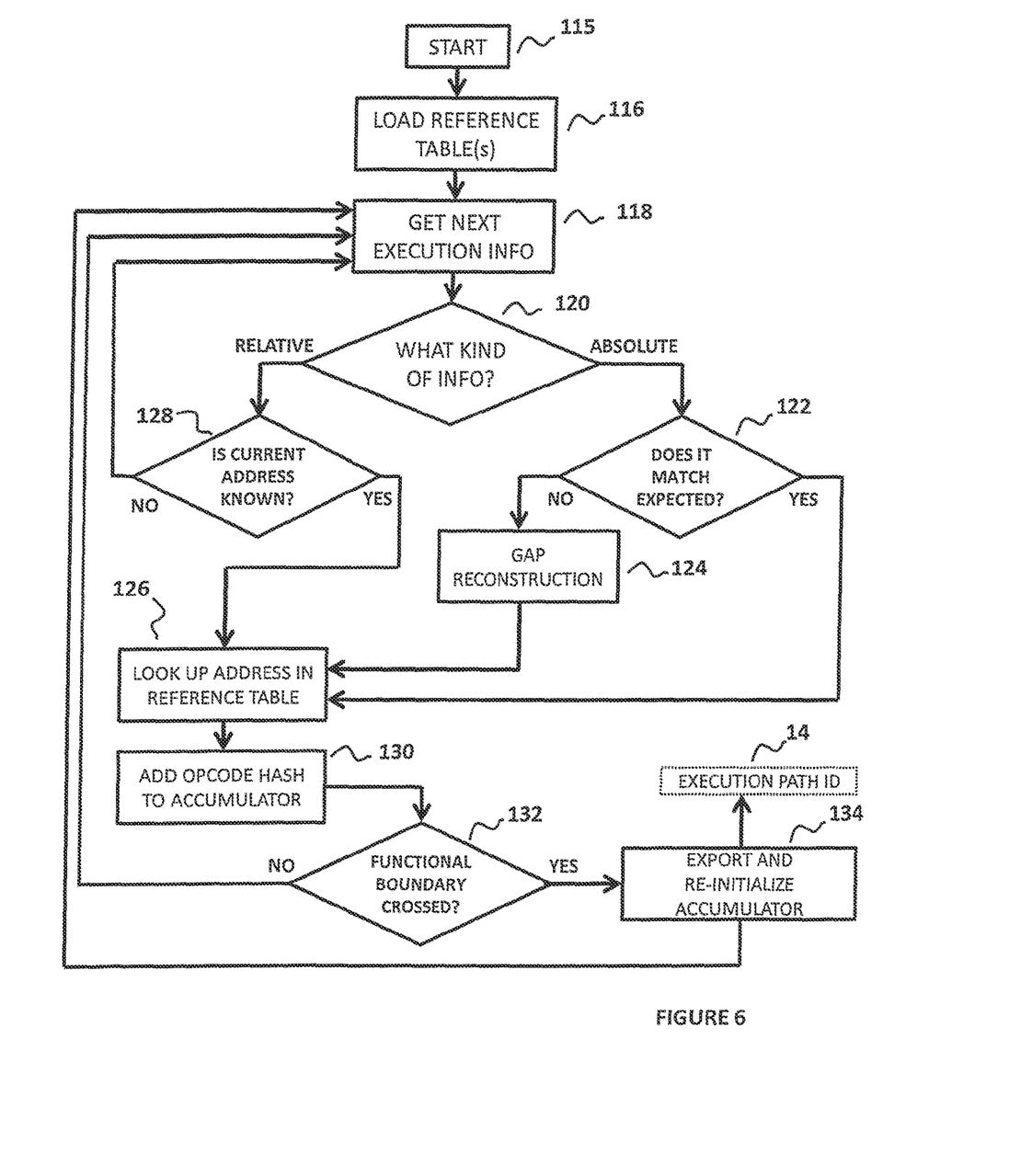
FIG. 6 shows a flow chart depicting the compression operation implemented in combination with an execution trace reconstruction system.

FIG. 6 is a flow diagram that depicts the present invention as may be implemented to work with existing instruction trace information, such as that produced by real-time trace interfaces such as ARM ETM, MIPS PDTrace, IEEE/ISTO Nexus-5001 or similar, or instrumented trace information available from processor simulators or emulators. In this embodiment, the software execution information 11 may be encoded and my contain gaps in the information that require reconstruction.

As illustrated in FIG. 6, operation starts at step 115. At step 116, one or more program reference tables are loaded. After that, the next software execution information 11 from FIG. 1 is received from computer system 10 (shown in FIG. 1) at step 118. At step 120, it is determined whether the execution information has relative or absolute address value. If determined that the execution information 11 has an absolute address value, then the operation goes to step 122, where it is determined whether the address value matches the expected execution address. If the answer is "no", the operation goes to step 124, where gap reconstruction is conducted. Following the step 124, the operation goes to step 126, where the address is looked up in reference table. If the answer at step 122 is "yes", then the operation goes directly to step 126, where the address is looked up in reference table.

If is determined at step 120 that the execution address information has a relative value, then the operation goes to step 128, where it is determined whether the current execution address is known to the system 8. If the answer at step 128 is "yes", then the relative address information is summed with the current known address and operation goes to step 126, where the address is looked up in reference table. If the answer is "no", the operation goes back to step 118.

Following the step 126, the operation goes to step 130, where opcode hash is added to and summarized in the accumulator 18. Then, it is determined whether the functional boundary is reached at step 132. If the answer is no, the operation goes back to step 118. If the answer at step 132 is yes, then the operation goes directly to step 134, where the resulting sum in the accumulator 18 generated at the step 130 is exported as a unique, repeatable representation of the behavior of that segment of the software program at step 112, and the accumulator 18 is reset to a base value to begin accumulation of the path identification of the software execution information of the next segment of the software program. The resulting sum represents the execution path identifier 14.

The decoding and gap reconstruction are performed by the above described flow steps, and their results are used with the reference table to look up the current instruction opcode and its pre-computed canonical hash, as well as the pre-computed functional boundaries and locations of conditional instructions. These are then presented to the accumulator 18 as described above.

The system 8 according to the present invention continuously collects and categorizes the execution information, thus imposing no limits on the software developer's visibility into the executing software program.

Figure 7:
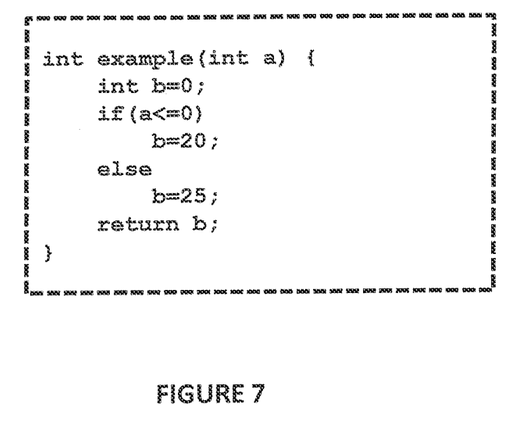
FIG. 7 shows a source code of an exemplary software function.

FIG. 7 shows an example of a simple exemplary software function: test the value of an argument, and return one of two possible values as a result of that test. TABLE 1 shows that same function along with a possible implementation using ARM architecture instructions for each source line. Please note that the opcodes for each instruction have a high degree of similarity. TABLE 2a shows an exemplary execution sequence of the exemplary function in FIG. 7, with a value of a variable "a" set to 0 before the function is called. Of note is that the condition for the execution of the instruction at <example+0xc> has not been met, so the branch is not taken and the instruction is treated as a no-operation instruction by the processor, and the accumulator 18 is presented with the inverse of the canonical hash of the opcode to reflect this conditional execution in the present path. The accumulator results are shown at each step, with a final value of "ad8f9a33" as the unique execution path identification, with optional inclusion of the starting address and count of instructions. TABLE 2b shows an exemplary execution sequence of the example function of FIG. 7, with the value of the variable "a" set to 1 before the function is called. Note that the change in execution path results in a drastic change in the unique value of the resulting path identification value.

TABLE 2c illustrates how even small changes in the executing software program will result in large changes to the resulting execution path identification value for the affected path(s), but may leave other execution paths in the same software program unaffected. In this modified example, the value returned for the values of the variable "a" less than 1 has changed from 25 to 24—a small change to the software program. However the resulting execution path identification value has changed drastically as a result, from "d4b696cd" to "7f46cfb4", This change only affects the path taken when the value of the variable "a" is greater than "0". The execution path identifier produced when the variable "a" is less than "0" remains the same as before.

TABLE 3 illustrates the appropriate insertion points for a software-only embodiment of the present invention. Using the same example code from FIG. 7, additional software would be inserted into the resulting executable software information at the indicated locations. This inserted software would use pre-computed values that represent the accumulated sums of the canonical opcode hash values, adding each to an accumulator value held in a designated location in the computer system, with additional instructions at function boundaries to initialize the accumulator value and export the results to the appropriate destination.

Figure 8:
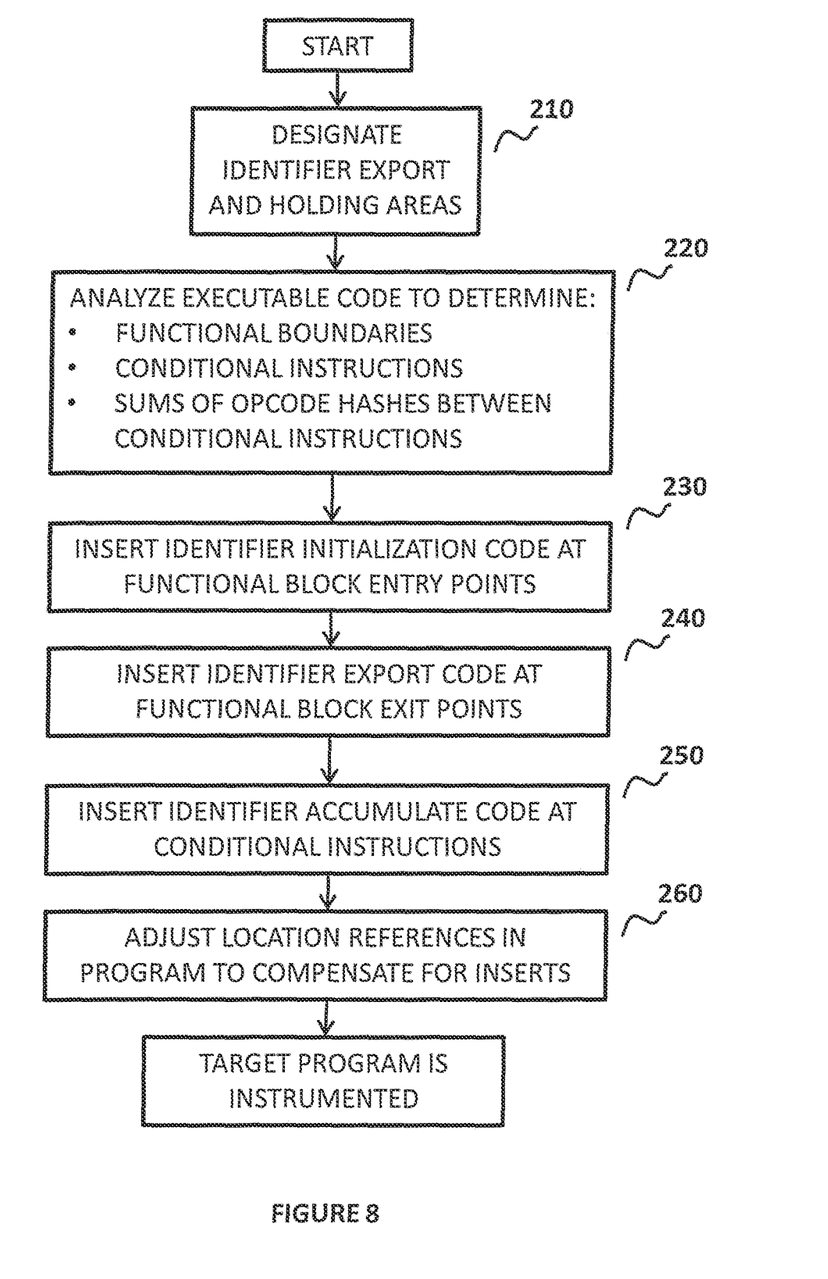
FIG. 8 shows a block diagram depicting the operations used in an exemplary software implementation of the present invention.

FIG. 8 depicts a method of analyzing the target software program and inserting additional software instructions in the target software program to implement the present invention in a software-only manner. The steps involved include: Designating resources to hold the in-process execution path identifier and resources for the export or storage of the resulting identifiers (step 210), analyzing the target software executable to identify functional boundaries and conditional instructions (step 220) and analyzing the instructions within the segments between and including the conditional instructions to create a sum of the opcodes with optional removal of address information and hashing (step 220), inserting into the target executable the necessary instructions to implement the functions of the present invention (steps 230, 240 and 250), and adjusting the program address references to compensate for the additional inserted instructions (step 260). When the resulting target software is executed, a series of execution path identifiers will be produced per the present invention.

Figure 9:
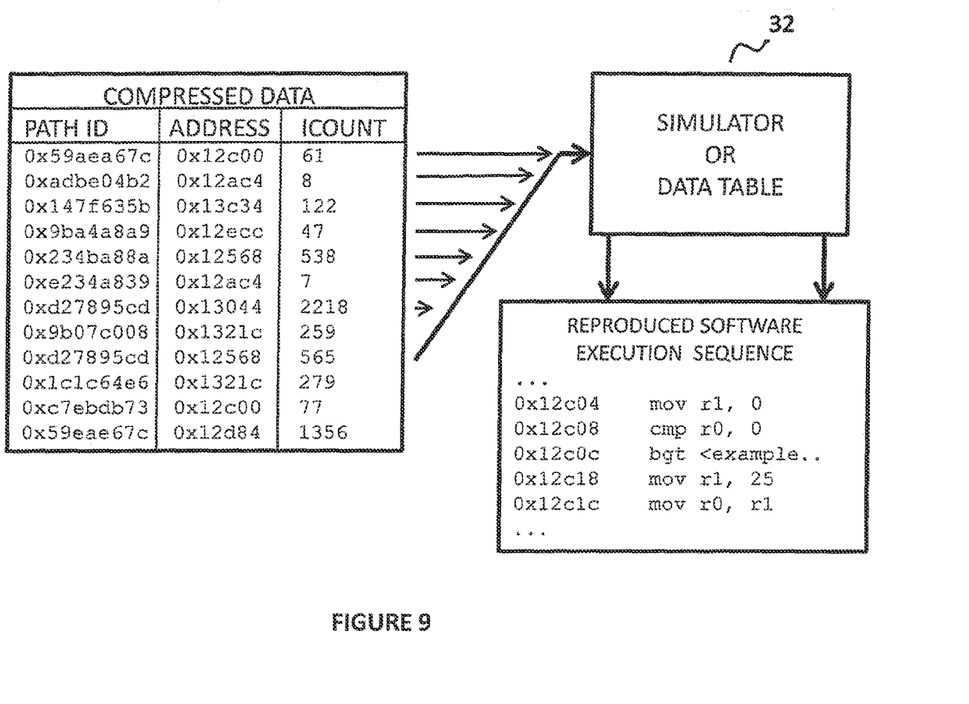
FIG. 9 shows a block diagram depicting decompression of the stored execution path identifier sequences back into a complete stream of software execution path trace data.

FIG. 9 depicts decompression of the compressed execution trace data (the execution sequence of said execution instructions') back to a reconstructed representation of their original form using the execution path identifiers, A sequential record of the created execution path identifiers and optional starting addresses and instruction counts are passed in chronological order to simulator or data table logic 32, which reconstructs the equivalent execution path necessary to create the presented execution path identification value. The logic within the block 32 can in one instance be a simulator of the target computer system, iteratively searching for the identical path needed to produce a matching execution path identification value. This simulation operation can be accelerated by including either or both of the starting address and number of instructions of the presented execution path identifier, and can also be accelerated by using a data table of pre-computed execution path identifiers and their associated execution paths. In another instance, contents of the block 32 may be a larger data table containing the execution path identifiers and a complete pre-recorded or pre-computed execution trace record of the associated path. The resulting stream of execution trace information that matches the data represented by the presented execution path identifier is then produced, recreating the trace of execution in the target computer system.

Figure 10:
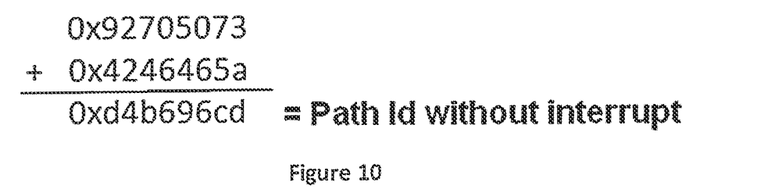
FIG. 10 illustrates post-processing that can remove intervening interrupt or exception handling code from a software execution path.

TABLE 4 and FIG. 10 depict handling of interrupts or exceptions. Normal execution proceeds at the top of TABLE 4 until an interrupt or other exception event alters the flow of execution. At this point the in-process path identifier is exported, along with the starting address and count of instructions within this partial path execution, and an indicator that the execution has been interrupted. Path identification of the interrupt/exception-handling code then proceeds as normal, resulting in the export of one or more path identifiers. If execution resumes within the interrupted function, it is treated as a start of a new function and the path identifier accumulator and instruction counters are reset, and the resume address is recorded as a new starting address for that path segment. FIG. 10 depicts the processing that could assemble the interrupted execution path segments back into a whole for direct comparison with uninterrupted peers, effectively removing the interrupt/exception processing from the execution path analysis. Please note that no resolution is lost: the exact moment an interrupt or exception occurs is preserved, and the interrupted function can still be treated as though it was not interrupted.

Figure 11:
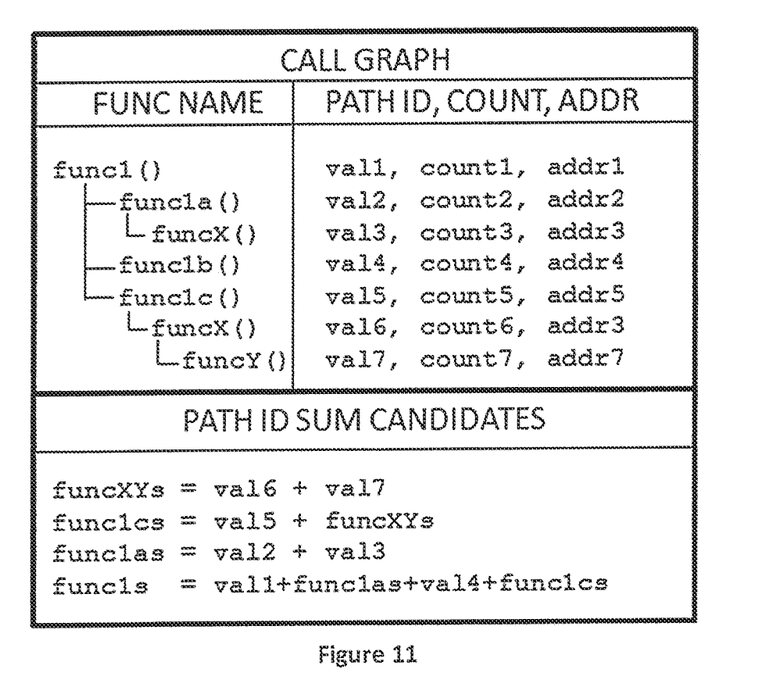
FIG. 11 illustrates further compression of the software execution instructions that can be included with the present invention.

It will be appreciated that the present invention is amenable to additional compression logic, which can dramatically increase the compression of the execution trace data. FIG. 11 depicts an embodiment of the present invention with execution 113 combine-and-store logic. In this example, a call graph depicts a series of software function calls, with each functional unit segment returning a unique path identifier. The additional logic sums the sequences of path identifiers and saves the resulting identifiers in a table, allowing subsequent calls resulting in the same series of path identifiers to use the combined identifier to replace the series. This results in ever-larger sequences of execution being represented by individual identifiers, vastly increasing compression of execution information, Furthermore, these path identifier sequences are combined using a simple sum operation, increasing compression with minimal additional resources. This compares favorably to general-purpose data compressors that require additional resources and can obfuscate the results and prevent direct use as a path identifier.

Therefore, the present invention provides a novel method and system of compressing software instruction execution trace sequences white simultaneously creating a unique identification for the sequence that is a direct representation of the software's behavior. The method and system of the present invention accesses information about the executed instructions in a computer system and converts that information into a uniquely representative identification of the specific conditions and execution path taken by a stream of execution.

Despite the ever-growing size and complexity of software programs, the key insight into reducing and simultaneously organizing the abundant execution data of a software program is that the software program is executed strictly within rigidly defined segments of instructions that are interconnected by branching junctions that have a finite number of connections. Furthermore, the execution path that is actually taken by a running software program is most often a very small subset of all possible paths.

It is with this insight that a means of compressing the execution information based on its behavior has been embodied in the present invention. By replacing extended sequences of execution with a uniquely representative and consistently repeatable execution path identifier for every uniquely executed path in the software program, unexpected benefits are produced. First, the execution path identifiers themselves are representative of distinct behaviors of the executed software functions, automatically classifying the execution trace data by its behavior. This profoundly simplifies software debugging, because every behavior of the software correct or incorrect is individually identified during compression, regardless of its transience or commonality. Reviewing the complete range of behaviors of the target program or any subset of interest can be done by decompressing the results at the appearance of each unique ID type for the functions of interest. Second, the compression ratio can be a dramatic improvement over the prior art, being able to replace the trace data of thousands of instructions with a single representative value. Third, because of the rigid-track nature of computer software execution, it is notable that when observed over extended periods of time, a software program will spend the vast majority of time executing within a small subset of all possible paths, and executing functions in frequently repeated sequences. This pattern of execution can be exploited to achieve extremely high compression ratios, by replacing extended sequences of already-observed functional unit executions with a single representative value.

This present invention offers significant advantages in that it can achieve much higher compression ratios than prior art, easing the burden of implementing into working computer systems, and that the compressor output is a direct representation of the functional behavior of the target software, and can be immediately used as an identifier for defect isolation and execution profiling, to assist software developers in rapidly learning intimate details about unfamiliar software code, and more.

The present invention is suitable for a plurality of embodiments: implementation in computer logic, thereby reducing the required capacity for trace export and storage; implementation with existing real-time trace processors; and as a software-only implementation for use with computer systems that may have no real-time trace export capabilities. By classifying the trace data by the behavior of the software being traced while compressing, It overcomes many of the difficulties found in the prior art, and can achieve higher compression ratios than previous techniques discussed above, while producing a result that is simpler to use for the tasks of software debugging, software testing and analysis, and in gaining a deeper understanding of how the software actually behaves during full-speed execution.

Also according to the present invention, a method and system is provided for inserting pre-computed software instructions into specific points of a software application to create unique execution path identifiers using a software-only approach. The method includes the steps of: analyzing the target software to determine the appropriate canonical hash values and appropriate insertion points in the application, inserting these additional instructions into the application at the appropriate conditional instructions and branch points, accumulating and storing the unique execution path identifiers at runtime to a designated memory buffer or output port, and retrieving the resulting execution path identifiers at runtime for immediate use or storage.

Through the method and system according to embodiments of the present invention, execution behavior identifiers can be created and collected from an operating computer system using minimal system resources, and compared to a computed set of identifiers representing a fill reconstruction of the execution path taken by the application. This results in abundant information that is pre-classified by behavioral type and therefore easier to differentiate which identifier represents software that is running in normal, expected ways, and which represents software that is running in new, potentially anomalous, and unexpected ways. This is particularly useful for software debugging, where countless hours are spent using existing techniques attempting the capture of transient events that are not yet fully understood. The present invention is also useful to quickly gain a deep understanding of unfamiliar software, because every behavior the software exhibits can be immediately identified as it happens. These benefits are amplified when the present invention is paired with additional system data capture, such as correlated capture of program variables, execution timing information, or external system signals at runtime.

The foregoing description of the exemplary embodiment of the present invention has been presented for the purpose of illustration in accordance with the provisions of the Patent Statutes. It is not intended to be exhaustive or to limit the invention to the precise forms disclosed. Obvious modifications or variations are possible light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. A method for creating software execution path identification, said method comprising the steps of:
   running a software program;
   continuously accessing execution information of said software program;
   identifying execution sequences of said software execution information; and
   creating a unique execution path identifier of each of said execution sequences by summing said execution information when said execution information is within a functional boundary thereof so as to create an execution path identifier representing a unique execution sequence of said execution information;
   the step of creating said unique execution path identifier comprises the steps of:
      removing any location-specific content from said execution information to produce address-independent canonical execution information;
      hashing said canonical execution information;
      modifying said hashed canonical execution information depending on conditions present at a time of execution; and
      creating an accumulated sum of said modified canonical execution information until said functional boundaries are reached, said accumulated sum represents said execution path identifier.

2. The method according to claim 1, wherein said execution information is in the form of conditional execution instructions.

3. The method according to claim 2, wherein said conditional execution instructions are in the form of at least one of opcodes and condition flags.

4. The method according to claim 1, further comprising the step of determining if each of said execution sequences of said software execution information being a new execution sequence or a repeat execution sequence.

5. The method according to claim 4, wherein the step of determining if each of said execution sequences being a new execution sequence or a repeat execution sequence includes the step of comparing said execution path identifier determined in the step of creating said unique execution path identifier with previously stored execution path identifiers.

6. The method according to claim 1, further comprising the step of recreating said software execution information from said execution path identifier.

7. A system for creating software execution path identification, said system comprising an execution path identification creator including a logic device for continuously receiving and accessing execution information of a software program and identifying execution sequences of said software execution information, and an accumulator for creating a unique execution path identifier of each of said execution sequences by summing said execution information when said execution information is within a functional boundary thereof so as to create an execution path identifier representing a unique execution sequence of said execution information;
   said functional boundary detected by said logic device;
   said logic device including a microprocessor;
   said execution path identification creator further includes:
      a device for removing any location-specific content from said execution information to produce address-independent canonical execution information;
      a device for hashing said canonical execution information;
      a device for modifying said hashed canonical execution information depending on conditions present at a time of execution; and
      a device for creating an accumulated sum of said modified canonical execution information until said functional boundaries are reached, said accumulated sum represents said execution path identifier.

8. The system according to claim 7, wherein said execution information is in the form of conditional execution instructions.

9. The system according to claim 8, wherein said conditional execution instructions are in the form of at least one of opcodes and condition flags.

10. The system according to claim 7, further comprising a local storage medium collecting said stream of said execution path identifiers for later retrieval and decompression.

11. The system according to claim 10, further comprising a comparison logic provided for determining if each of said execution sequences of said software execution information is a new execution sequence or a repeat execution sequence by comparing said execution path identifier determined by said execution path identification creator with said execution path identifiers previously stored in said local storage medium.

12. The system according to claim 7, further comprising a device for recreating said software execution information from said execution path identifier.

* * * * *